United States Patent
Ohama

(10) Patent No.: US 7,431,282 B2
(45) Date of Patent: Oct. 7, 2008

(54) DOCUMENT INVERTING-AND-TRANSPORTING APPARATUS

(75) Inventor: Takashi Ohama, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 478 days.

(21) Appl. No.: 10/809,448

(22) Filed: Mar. 26, 2004

(65) Prior Publication Data

US 2004/0217537 A1 Nov. 4, 2004

(30) Foreign Application Priority Data

Mar. 31, 2003 (JP) ............................. 2003-096179

(51) Int. Cl.
*B65H 29/66* (2006.01)
(52) U.S. Cl. .................. 271/65; 271/186; 271/258.01; 399/370
(58) Field of Classification Search ................. 271/186, 271/258.01, 65, 902; 399/364, 370, 373, 399/374, 376
See application file for complete search history.

(56) References Cited

U.S. PATENT DOCUMENTS

| 6,151,478 | A * | 11/2000 | Katsuta et al. | 399/372 |
| 6,393,251 | B2 * | 5/2002 | Kono | 399/370 |
| 6,434,359 | B2 * | 8/2002 | Nose et al. | 399/374 |
| 6,522,860 | B2 * | 2/2003 | Nose et al. | 399/374 |
| 6,648,320 | B2 * | 11/2003 | Iino et al. | 271/3.15 |
| 6,726,199 | B2 * | 4/2004 | Ina et al. | 271/65 |
| 7,033,014 | B2 * | 4/2006 | Ohashi et al. | 347/104 |
| 7,212,321 | B2 * | 5/2007 | Sugiyama et al. | 358/498 |
| 2002/0030321 | A1 * | 3/2002 | Sugiyama et al. | 271/226 |

FOREIGN PATENT DOCUMENTS

| JP | A 56-12654 | 2/1981 |
| JP | A 61-158320 | 7/1986 |
| JP | U 61-116353 | 7/1986 |
| JP | A 62-21665 | 1/1987 |
| JP | A-10-87187 | 4/1998 |
| JP | A-10-268442 | 10/1998 |

* cited by examiner

*Primary Examiner*—Patrick Mackey
*Assistant Examiner*—Michael C McCullough
(74) *Attorney, Agent, or Firm*—Oliff & Berridge, PLC

(57) ABSTRACT

A document inverting-and-transporting apparatus includes a transport path, an inversion-and-transport path, a document transporting unit, a closed portion, a document length detecting unit, a comparing unit, a controlling unit. The transport path includes a first route along which the document is transported from a feeding start position to a transport direction changing position; a joining position; and a reading position. The inversion-and-transport path includes a second route along which the document is transported from the transport direction changing position to the reading position via the joining position. The closed portion constitutes a part of the inversion-and-transport path. The comparing unit compares a detected length of the document with a predetermined length larger than a length of the closed portion. The controlling unit determines whether the document is to be transported to the inversion-and-transport path, based on a result of the comparison.

16 Claims, 12 Drawing Sheets

DOCUMENT INVERTING-AND-TRANSPORTING APPARATUS

BACKGROUND OF THE INVENTION

1. Field of the Invention

The present invention relates to a document inverting-and-transporting apparatus having a configuration in which a two-sided document bearing images on the two faces is inverted, and more particularly to a document inverting-and-transporting apparatus which is to be mounted on an image reading apparatus having a reading unit which reads an image of a document.

2. Description of the Related Art

Conventionally, a document inverting-and-transporting apparatus that is configured so that a document the surface of which has been read is inverted and then transported, and the rear face is read is disclosed in JP-A-Sho.62-21665, etc. In the apparatus of JP-A-Sho.62-21665, a document is fed from a feeding portion disposed above the apparatus to a guide plate, then transported onto a platen glass disposed in a lower portion along a U-like guide portion disposed in the guide plate, and when the front end of the document abuts against one end of the platen glass, the document is stopped. A reading process is then conducted. While setting the rear end foremost, the document is thereafter passed through a inlet port of an inversion path opened in one end side of the platen glass, to enter the inversion path which is formed in a U-turn path by a pair of thin metal plates, and then upward transported to be again fed to the guide portion through an outlet port which is opened in the middle of the guide portion. The document in a state in which the face is inverted with respect to that in the previous operation is transported onto the platen glass, and the reading process is then conducted.

In the thus configured document inverting-and-transporting apparatus, plural transport rollers serving as a unit for transporting a document are arranged at intervals in the transport path. When the distance between the transport rollers is set to be shorter than the minimum length of a document used in the document inverting-and-transporting apparatus, the transported state of a document is always maintained by at least two of the transport rollers, so that the document can be surely transported. When the length of the inversion-and-transport path is set to be longer than the maximum length of a document used in the document inverting-and-transporting apparatus, the front and rear ends of an inverted document do not overlap with each other, so that a transport failure due to overlapping of a document and a damage of front and rear ends of a document can be prevented from occurring.

SUMMARY OF THE INVENTION

However, the document inverting-and-transporting apparatus of JP-A-Sho.62-21665 is not configured so that all the paths through which a document is to be transported can be opened. Particularly, the inversion-and-transport path is often configured so as not to be opened. Namely, it is often that paths other than the inversion-and-transport path can be partly opened. When a jam which is caused by a bent document in the inversion-and-transport path, or that in which a document that is shorter than a distance between adjacent transport rollers (or that is shorter than the minimum length of a document, which can be used in the document inverting-and-transporting apparatus) is erroneously fed into the inversion-and-transport path and transport is disabled once occurs, therefore, the jammed document cannot be removed away unless the whole apparatus is disassembled. Consequently, it is difficult for the user of the apparatus to easily eliminate a jam in the inversion-and-transport path.

Disclosed herewith is a document inverting-and-transporting apparatus, which can solve the problems, and in which a jam causing document transport to be disabled can be prevented from occurring in a closed portion such as an inversion-and-transport path, and occurrence of a jam in the inversion-and-transport path can be informed to the user at an early stage where the jam can be eliminated, immediately.

According to an embodiment of the invention, a document inverting-and-transporting apparatus is to be mounted on an image reading apparatus having a reading unit which reads an image of a document at a reading position. The document inverting-and-transporting apparatus includes a transport path, an inversion-and-transport path, a document transporting unit, a closed portion, a document length detecting unit, a comparing unit, a controlling unit. The transport path includes a first route along which the document is transported from a feeding portion to a transport direction changing position; a joining position; and the reading position, wherein the joining position and the reading position are disposed at predetermined positions in the first route in a sequence along a document transport direction. The inversion-and-transport path includes a second route along which the document is transported from the transport direction changing position to the reading position via the joining position. The document transporting unit transports the document. The closed portion constitutes a part of the inversion-and-transport path. The document length detecting unit detects a length of the document before the document is transported from the transport direction changing position to the inversion-and-transport path. The first comparing unit compares the detected length of the document with a predetermined length which is larger than a length of the closed portion. The controlling unit, on the basis of a result of the comparison by the first comparing unit, controls whether the document is transported to the inversion-and-transport path or not.

According to the embodiment of the invention, a document inverting-and-transporting apparatus includes a transporting unit, a transport path, an inversion-and-transport path, a document length detecting unit, a first comparing unit, and a controlling unit. The transporting unit transports a document. The transport path includes a joining position, a reading position where the document is read by a reading unit, and a transport direction changing position where the transporting unit changes a transport direction of the document. The inversion-and-transport path is between the transport direction changing position and the joining position without including the reading position. The document length detecting unit detects a length of the document. The first comparing unit compares the detected length of the document with a predetermined length which is equal to or larger than a length between the joining position and the document direction changing position. The controlling unit, on the basis of a result of the comparison by the first comparing unit, controls whether the document is transported to the inversion-and-transport path or not.

DETAILED DESCRIPTION OF THE PREFERRED EMBODIMENT

Hereinafter, a first embodiment of the invention will be described with reference to the accompanying drawings.

The embodiments of the invention are applied to a document inverting-and-transporting apparatus 2 to be mounted on an image reading apparatus of a multi function device (composite device) 1 having a facsimile function, a scanner function, a copier function, and a printer function.

Figure 1:
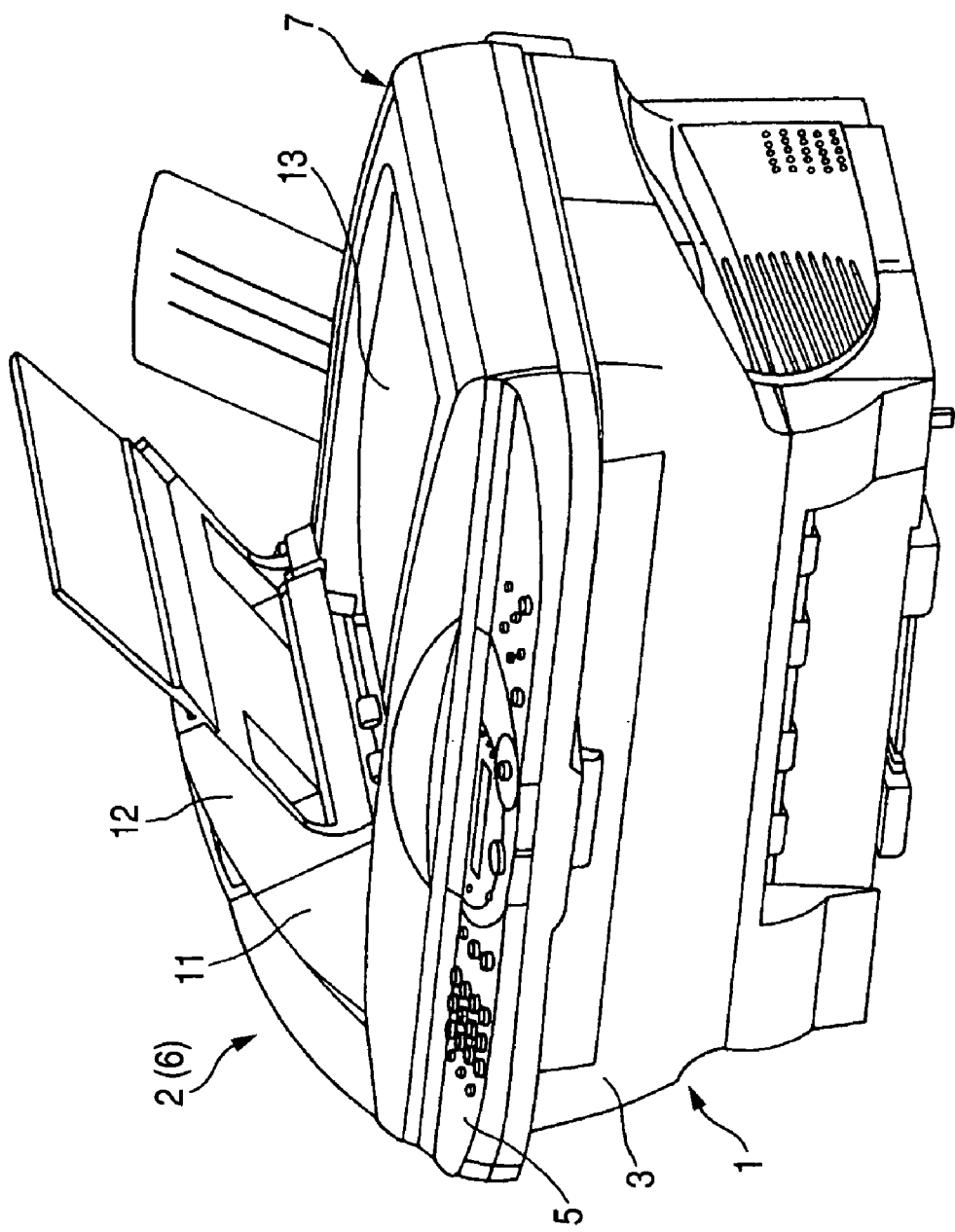
FIG. 1 is a perspective view of a multi function device including a document inverting-and-transporting apparatus according to embodiments of the invention.
Figure 2:
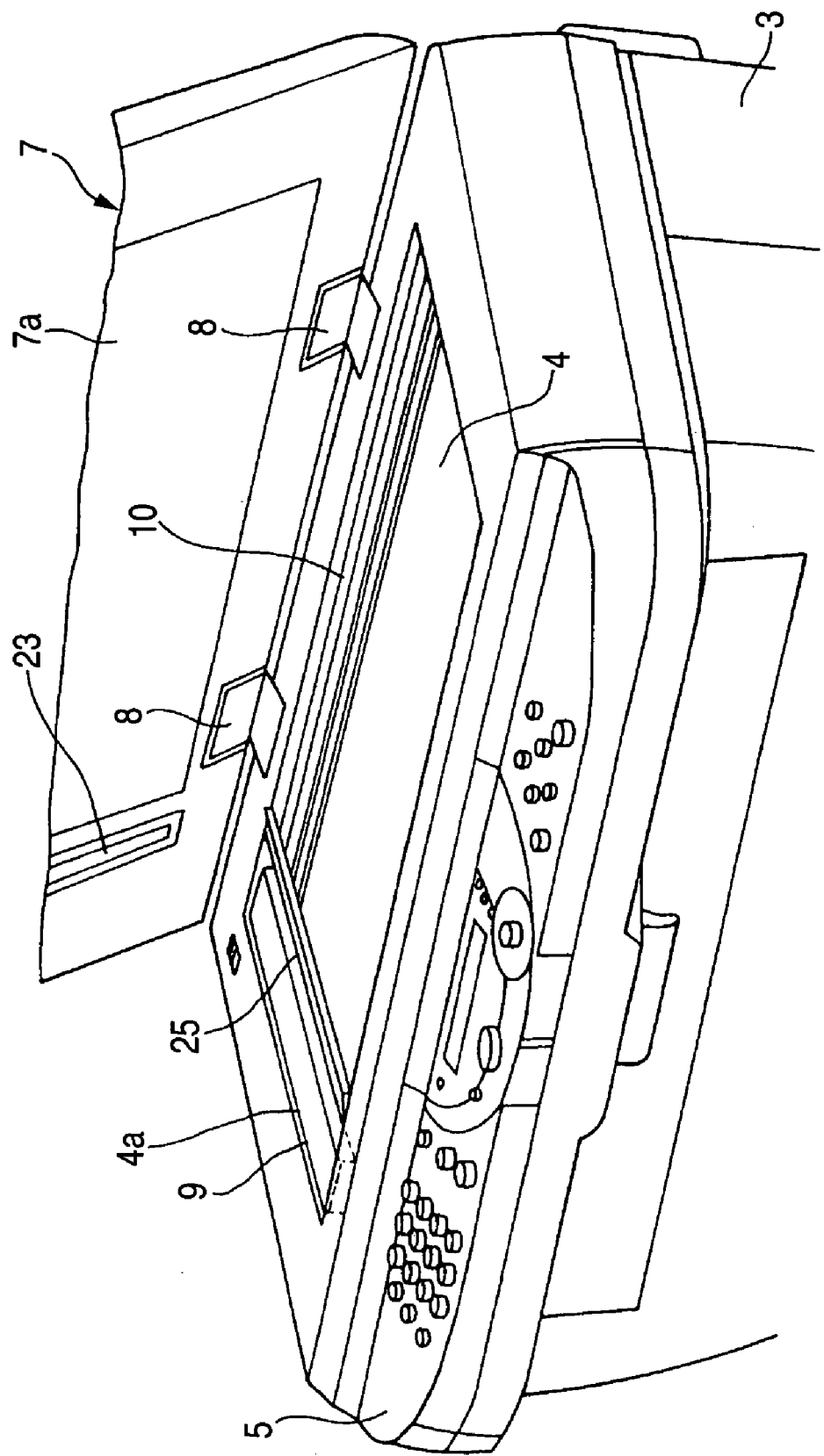
FIG. 2 is a partial perspective view showing a state where a cover member of the multi function device is upward swung from a body case.

As shown in FIGS. 1 and 2, a large glass plate 4 on which a document is to be placed is horizontally fixed to the upper face of a body case 3 of the multi function device 1. An operation panel 5 is placed on the upper face of the body case 3 in front of the glass plate. The operation panel 5 includes a ten-key pad for implementing the facsimile, scanner, and copier functions, button keys for instructing various works, and a liquid crystal display panel on which contents of instructions, an error indication, and the like are to be displayed. A lid-like cover member 7 is attached via hinges 8 to the rear edge of the upper face of the body case 3 so as to be vertically swingable. The document inverting-and-transporting apparatus 2 according to the embodiments of the invention is disposed on one side of the upper face of the lid-like cover member 7.

The image reading apparatus which implements the scanner function includes a reading device 9 (for example, a line type CCD imaging device) which is positioned on the lower face side of an end glass plate 4a fixed to one end of the upper face of the body case 3. The document inverting-and-transporting apparatus 2 is configured so that a document P fed from an automatic document feeding apparatus 6, which is disposed on the upper face of the lid-like cover member 7 so as to be continuous with the document inverting-and-transporting apparatus 2, is transported by a document transporting unit 300 (see FIG. 7). An image of the document P is read at a reading position 23a by the reading device 9 (see FIG. 4).

Also, in this embodiment, a document is placed on the large glass plate 4 of the upper face of the body case 3 with downward directing a face bearing an image. In a state where the document is pressed by a press member 7a, which is disposed on the lower face of the lid-like cover member 7 and is formed of a sponge and a white plate, the reading device 9 reads the image in response to a image read command while moving along a guide rail 10 placed on the lower face of the large glass plate 4.

The document inverting-and-transporting apparatus 2 includes a transport path 51 and an inversion-and-transport path 52. In the transport path 51, one face of the document P fed from a feeding portion 41 is read at the reading position 23a and the document is then discharged. The inversion-and-transport path 52 inverts a document that has been once read, and joins the transport path 51. In the transport path 51 and the inversion-and-transport path 52, plural transport rollers serving as the document transporting unit 300 are arranged at adequate intervals.

The transport path 51 has a route along which the document P is transported from the feeding portion 41 feeding the document P to a transport direction changing position 42, which reverses the transport direction of the document P, via a joining position 43 and the reading position 23a. The joining position 43 and the reading position 23a are placed respectively at predetermined positions of the first route, or the joining position 43 is on the upstream side in the document transport direction, and the reading position 23a is on the downstream side. The inversion-and-transport path 52 has a route along which the document P is transported from the transport direction changing position 42 to the reading position 23a via the joining position 43.

In a specific embodiment, the position of a feed roller pair 17a, 17b which will be described later is set as the feeding portion 41, and that of a discharge roller pair 19, 20 which will be described later is set as the transport direction changing position 42. The roller 19 is a driving roller, and the roller 20 is a driven roller.

The configurations of the transport path 51 and the inversion-and-transport path 52 will be described in detail. A case portion 11 of the automatic document feeding apparatus 6 is fixed to one side of the lid-like cover member 7. A document table 12 is inclinedly placed on one end of the case portion 11 in such a manner that the free end is positioned at a higher level and the position of attachment to the case portion 11 is positioned at a lower level. Documents P are stacked on the document table 12. On the other hand, a discharge tray portion 13 is formed on the upper face of the lid-like cover member 7, which is below the document table 12 (see FIGS. 1 and 3).

Figure 3:
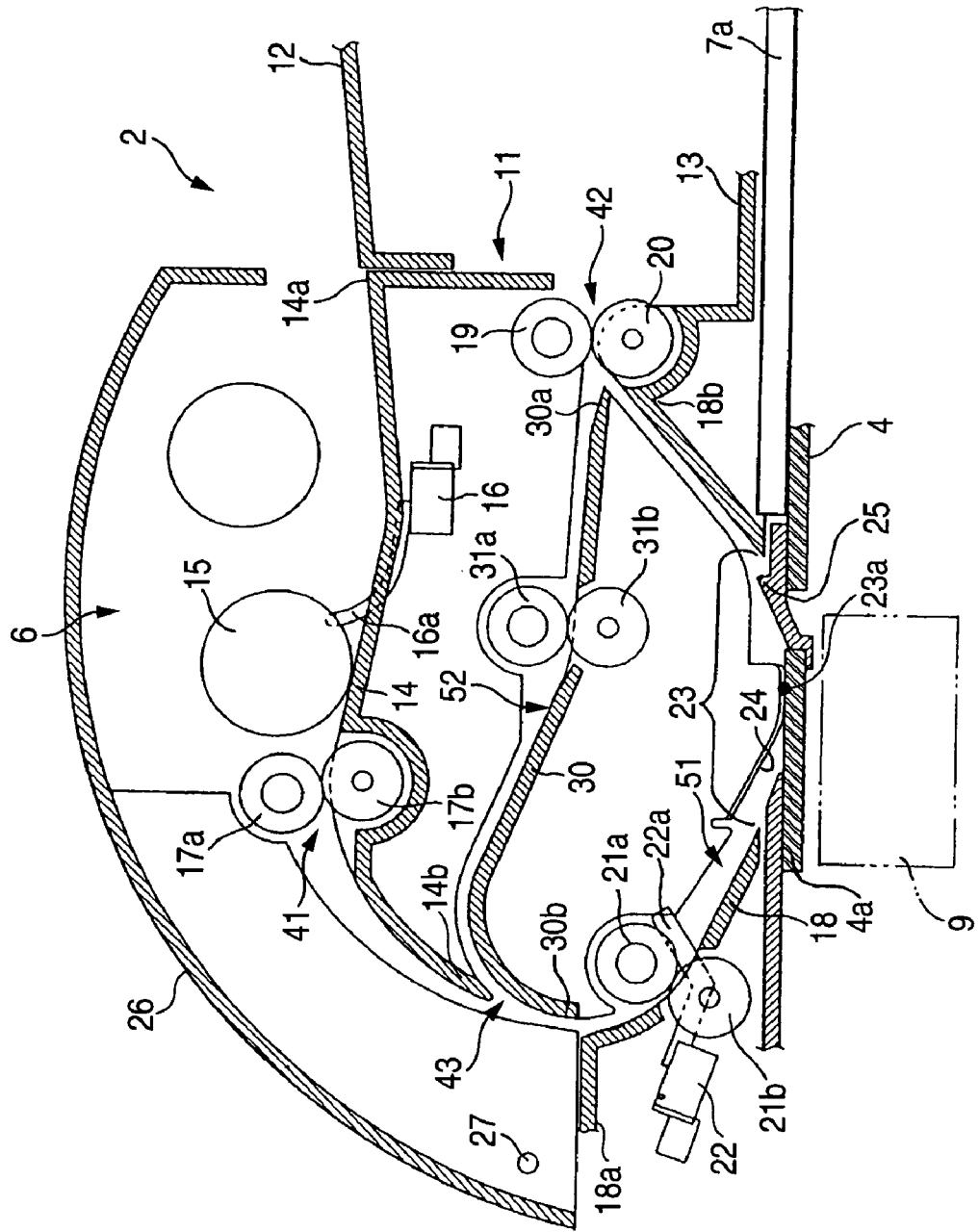
FIG. 3 is a side section view of main portions of the document inverting-and-transporting apparatus according to a first embodiment.

As shown in FIG. 3, a leading end portion 14a of an upper route plate 14 in the case portion 11 is placed in close proximity to the document table 12. A separation roller 15, which separates the documents P stacked on the document table 12 and feeds the separated documents one by one, a sheet sensor 16 having a detection lever 16a, which is swung by collision with the front edge of each document P, and feed rollers 17a, 17b (the feeding portion 41) are disposed on the upper route plate 14. A tail end portion 14b of the upper route plate 14 is formed into a downward-directed arcuate shape so as to guide the document P to a lower route plate 18.

In the vicinity of a leading end portion 18a of the lower route plate 18, feed rollers 21a, 21b are disposed immediately upstream of the reading position 23a. A rear sensor 22 having a detection lever 22a is disposed in the vicinity of the rollers. The rear sensor 22 detects whether a document exists or not, and detects the length of a document. When the detection lever 22a is swung by collision with the document P, the rear sensor 22 can detect existence of a document, and measures the distance of document feeding in a period from a timing when swinging is caused by the front edge of the document P to that when the swinging is cancelled as a result of passing of the rear end, whereby the document length L can be detected.

A tail end portion 18b of the lower route plate 18 extends to the place where the discharge roller pair 19, 20 (the transport direction changing position 42) is placed in the base area of the discharge tray portion 13.

A middle portion, in the transport direction, of the lower route plate 18 is formed into a downward-directed convex arcuate shape. A reading opening 23, which has a rectangular shape in a plan view, is opened at the lowest position thereof and in a region extending across the reading position 23a, so as to be opposed to the reading device 9. The reading opening 23 is formed so that the dimension in the document transport direction is shorter, and that in the direction perpendicular to the document transport direction is longer (see FIGS. 2 and 3), and has a size which is sufficiently large for picking out the document P from the reading opening 23 when a jam occurs as described later. A plurality of ribs 24 are placed above the lower route plate 18 (in the case portion 11). The ribs 24 enable the document P to be passed through a narrow gap, and cause the lower face (the face to be read) of the document P to be in sliding contact with the surface of the end glass plate 4a in the reading opening 23 and at the reading position 23a. A guide piece 25 for guiding the document P, which has passed the reading position 23a, to the upper face of the lower route plate 18 on the downstream side in the transport direction is fixed to an end edge of the end glass plate 4a.

An intermediate route plate 30 is disposed between the upper route plate 14 and the lower route plate 18. A leading end portion 30a of the intermediate route plate 30 is placed in close proximity to the discharge roller pair 19, 20. The rotation direction of the discharge roller pair 19, 20 can be switched over between that in which the document P is discharged toward the discharge tray portion 13, and that in which the document P is transported toward the intermediate route plate 30 (the inversion-and-transport path). In this embodiment, the transport direction changing position 42 functions also as a document discharging portion to eliminate the space necessary for it. Each roller is driven by a single driving motor 301 shown in FIG. 7. The transport distance of the document P after the timing when the rear sensor 22 detects existence of the document can be measured on the basis of the number of rotation steps of the driving motor 301. The separation roller 15, the feed roller pair 17a, 17b, the feed roller pair 21a, 21b, and a feed roller pair 31a, 31b are configured so as to be rotated in one direction irrespective of the rotation direction of the driving motor 301. Only the discharge roller pair 19, 20 is configured so that the rotation direction is changed in accordance with a change of the rotation direction of the driving motor 301. The leading end portion 30a of the intermediate route plate 30 has a guiding shape, which is inclined so that the region on the side of the discharge roller pair 19, 20 is positioned at a slightly lower level, thereby, when the document P is returned into the apparatus by the discharge roller pair 19, 20, allowing the document to be preferentially fed toward the intermediate route plate 30 instead of the lower route plate 18. The feed roller pair 31a, 31b which assists the transport of the document P is disposed downstream of the leading end portion 30a of the intermediate route plate 30 in the transport direction. In another embodiment, the feed roller pair 31a, 31b may not be disposed. A tail end portion 30b of the intermediate route plate 30 is formed into a downward-directed arcuate shape which extends along the downward-directed arcuate shape of the tail end portion 14b of the upper route plate 14, and placed so as to partly overlap with the leading end portion 18a of the lower route plate 18. An area of the tail end portion 30b functions as the joining position 43 between the transport path 51 and the inversion-and-transport path 52.

The upper route plate 14 is fixed so as not to be openable. Therefore, the route passing the intermediate route plate 30, which is a part of the inversion-and-transport path 52, i.e., the portion corresponding to the route elongating from the transport direction changing position 42 to the joining position 43 without passing the reading position 23a, is formed as a closed portion which is not exposed to the outside. The base end of a swing cover member 26, which is on the side (opposite to the document table 12) of one end of the case portion 11 is vertically swingable about an axis 27 so that the joining position 43 can be exposed to the outside. When the swing cover member 26 is opened, therefore, the document P, which is jammed in the portion of the upper route plate 14, can be removed away, and also the document P an end portion of which is exposed as a result of a jam to the joining position 43 from the side of the intermediate route plate 30 or the lower route plate 18 can be removed away.

Figure 7:
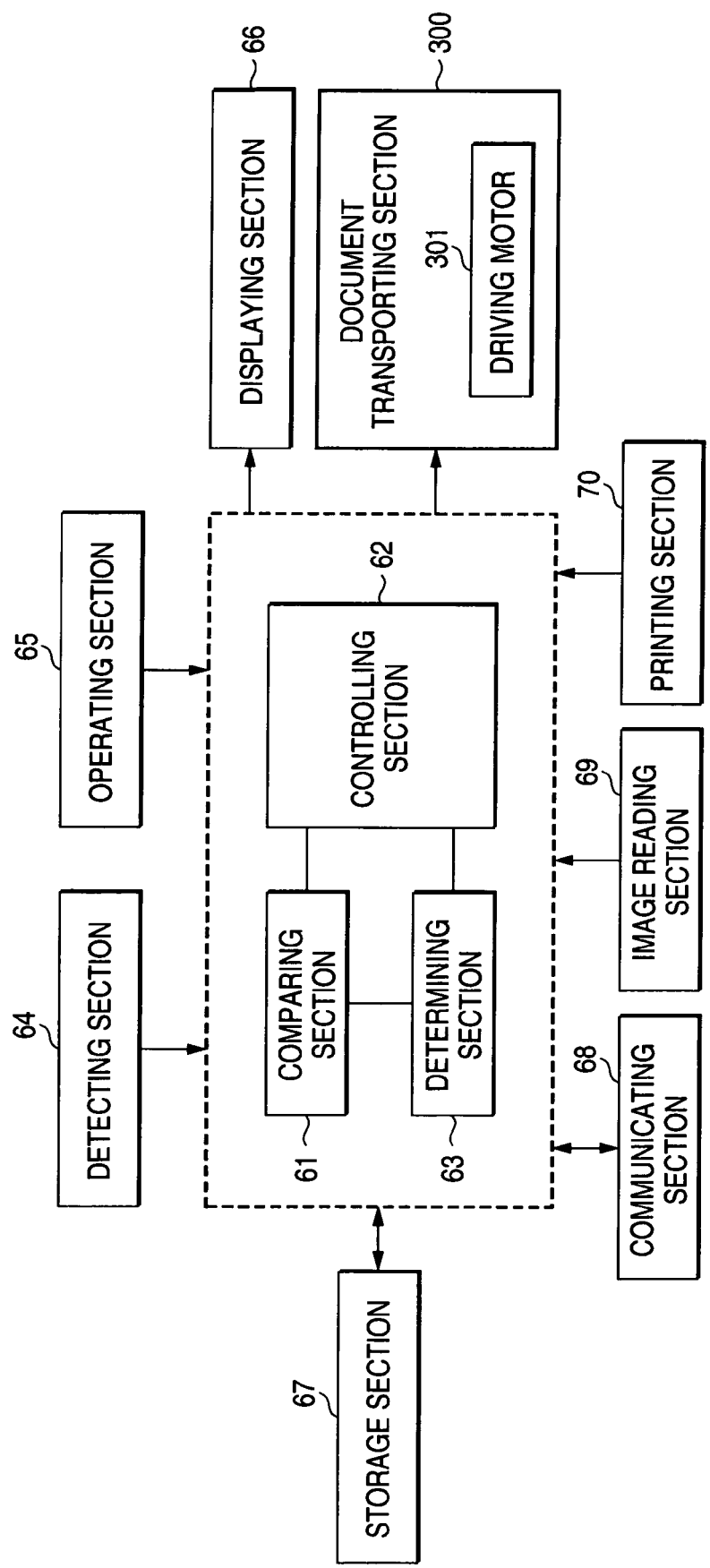
FIG. 7 is a block diagram of a control system of the multi function device.
Figure 8:
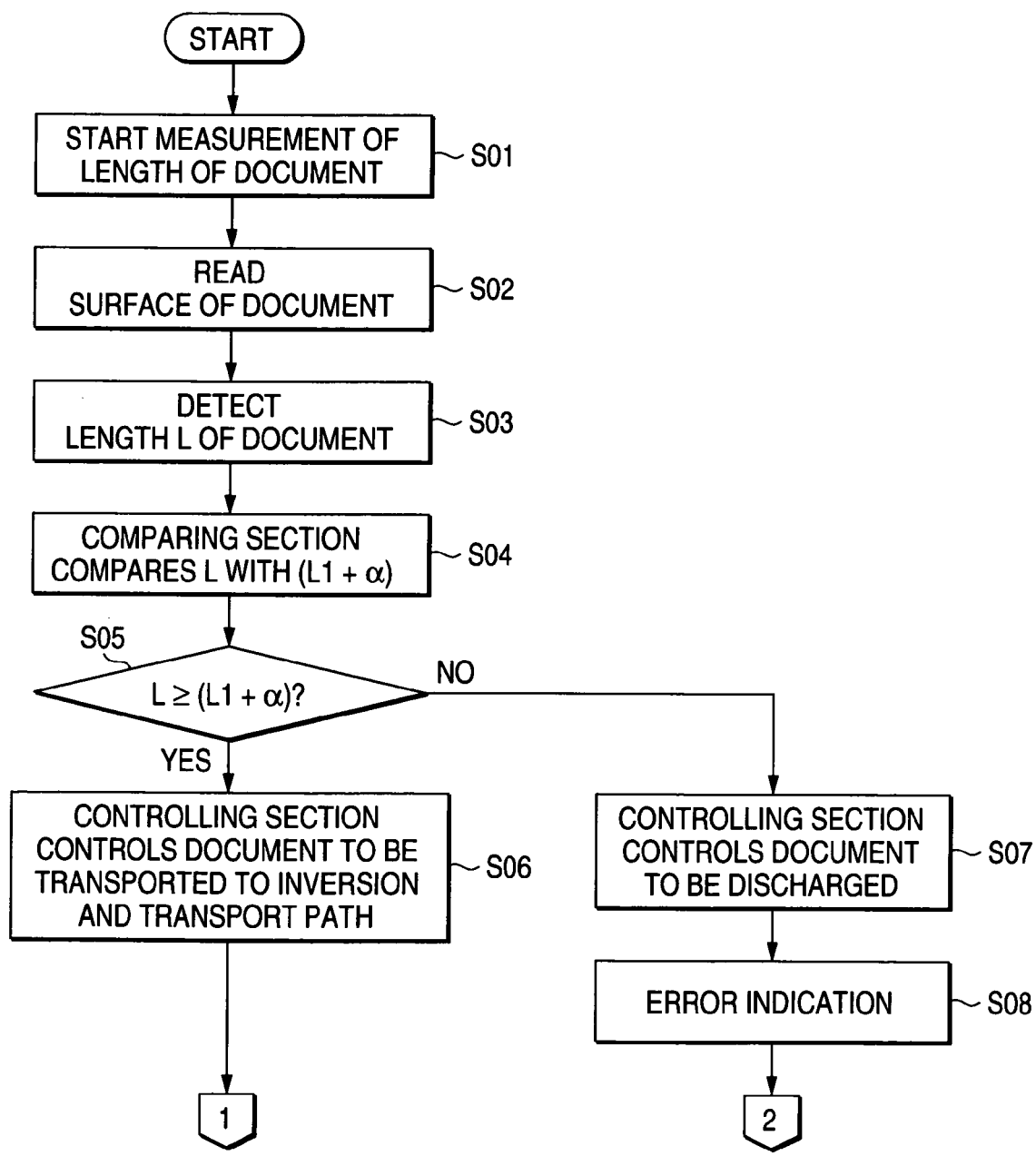
FIG. 8 is a flowchart showing an operation of the document inverting-and-transporting apparatus.
Figure 9:
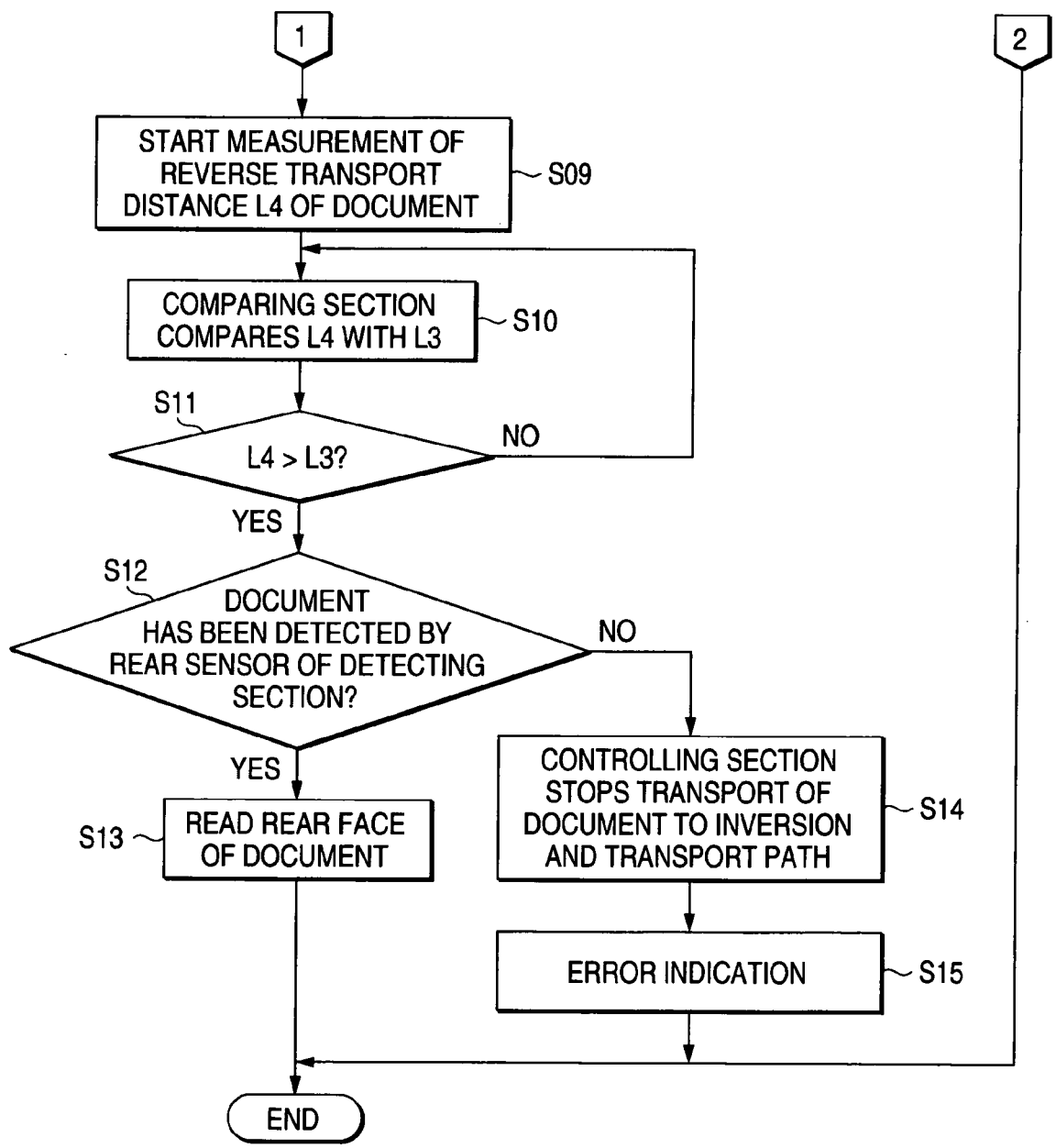
FIG. 9 is a flowchart showing an operation of the document inverting-and-transporting apparatus.

Next, a control system of the multi function device 1 will be described with reference to the block diagram of FIG. 7. As shown in FIG. 7, the control system includes a comparing section 61, a controlling section 62, a determining section 63, a detecting section 64, an operating section 65, a displaying section 66, and a storage section 67. The comparing section 61, the controlling section 62, and the determining section 63 are configured by a CPU or the like. The storage section 67 includes a semiconductor memory, a hard disk, and the like, and temporarily stores various programs required for controls, data which are calculated by the CPU, image data which are read or received, etc. The detecting section 64 includes, for example, the rear sensor 22, which has the detection lever 22a and detects the length of a document and existence of a document, and the sheet sensor 16, which detects feeding of a document and has the detection lever 16a. The operating section 65 includes button keys disposed in the operation panel 5, and the like. The displaying section 66 includes a liquid crystal display panel disposed in the operation panel 5, etc. The control system further includes a communicating section 68 to which a telephone line or the like is connected, an image reading section 69 such as a scanner, and a printing section 70 such as a printer.

The storage section 67 previously stores lengths of partial routes of the transport path 51 and the inversion-and-transport path 52, as data required for controls. In the embodiment, the length L1 (see FIG. 4) of the closed portion (the route elongating from the transport direction changing position 42 to the joining position 43 without passing the reading position 23a), and the length L3 (see FIG. 6) of the route elongating from the transport direction changing position 42 to the position of the press contact point between the feed rollers 21a, 21b via the joining position 43 without passing the reading position 23a are previously stored in the storage section. In more detail, the position of the document detection lever 22a of the rear sensor 22, which detects a document, does not coincide with that of the press contact point between the feed rollers 21a, 21b, and hence a corrected value is used as L3. A depth dimension α(about 10 mm) from an edge of a document is set as a dimension which, when a document is jammed, is required by the user to pick out the document. This dimension α is also previously stored in the storage section 67.

In the control system, the programs are set in the following manner. When a command for reading the front and rear faces of a document is input through the operating section 65, the comparing section 61 compares the document length L, which is obtained from the number of rotation steps of the driving motor 301 in a period from a timing when the front end of the document is detected by the rear sensor 22 of the detecting section 64 to that when the rear end of the document is detected, with (L1+α) which is obtained by adding α to L1. If the result of the comparison is L≧(L1+α), the controlling section 62 controls the document transporting unit 300 so that the document is once discharged by the discharge roller pair 19, 20, and, before the document is completely discharged, reverses the rotation direction of the driving motor 301 to feed the document P to the inversion-and-transport path 52. If the result of the comparison is L<(L1+α), the controlling section 62 inhibits the document P from being fed to the inversion-and-transport path 52. In the embodiment, in the case of L<(L1+α), the document transporting unit 300 is controlled so that, one face of the document P is read at the reading position 23a by the reading device 9, and the document is then discharged to the discharge tray portion 13 without changing the rotation direction of the driving motor 301. Alternatively, the control system may be configured so that, when the user operates a selection switch (not shown) in the operation panel 5, the document P is discharged without reading one face of the document.

Furthermore, the programs are set so that, in the case where the document P is not fed to the inversion-and-transport path 52 but discharged to the discharge tray portion 13, an error indication indicating that the length of the document is not adequate for double-face reading is displayed on the displaying section 66.

When the document P is transported to the inversion-and-transport path 52 although the document length L is shorter than L1, there arises the possibility that the document remains in the closed portion (the route of the upper face of the intermediate route plate) and cannot be transported because the length of the document P is short. In this case, the document cannot be removed away unless the apparatus is disassembled, and hence the user hardly copes with such a trouble. Therefore, the programs are set so that, only when L≧(L1+α), the document P is transported to the inversion-and-transport path 52 as described above. As a result, at a timing when the rear end of the document P leaves the transport direction changing position 42, the front end of the document P transported to the inversion-and-transport path 52 usually reaches at least the joining position 43. Since the joining position 43 can be exposed by opening the swing cover member 26, the document P can be removed away by pulling out the front end of the document P. The document length L is longer than L1 by at least a which enables the document to be picked out. Therefore, the front end of the document P exposed from the joining position 43 is ensured to have a dimension which allows the user to easily pick the document.

In the control system, the programs are set also in the following manner. When reading of the rear face of the document is allowed, the transport distance L4 of the document P to the inversion-and-transport path 52 is measured on the basis of the number of rotation steps of the driving motor 301 the count of which is started after the rotation direction of the driving motor 301 is reversed. The comparing section 61 compares the transport distance L4 with the length L3. If, although L4>L3, the front end of the document P is not detected by the rear sensor 22 of the detecting section 64, the determining section 63 determines that a jam occurs in a range between the discharge roller 19 (20) and the rear sensor 22 in the inversion-and-transport path 52. Then, the controlling section 62 controls the driving motor 301 so as to stop the rotation (document feed) of the discharge roller pair 19, 20, and the displaying section 66 to display an error indication indicating that a jam occurs.

The above-mentioned state where a document length which allows a document to reach from the discharge roller 19 (20) to the position of the rear sensor 22 is fed but existence of a document is not detected by the rear sensor 22 can be determined as a state where the document P is jammed in a place including the closed portion of the inversion-and-transport path 52. Therefore, the document feed is immediately stopped, and the error indication is displayed, whereby the jam is prevented from being aggravated to a degree at which the jammed document cannot be removed away. In a specific embodiment, a predetermined amount for determining whether a jam occurs or not is indicated by β, and, if L4>(L3+β), it is determined that a jam occurs. When the value of β is adjusted, it is possible to arbitrarily control the criterion to determine whether a jam occurs or not. As described above, a jam in the closed portion is hardly cleared because of its structure. Therefore, β is set to a relatively small value, so that occurrence of a jam is determined as rapidly as possible.

In the embodiment, the transport direction changing position 42 is in the place of the discharge roller pair 19, 20. In the case where the rear end of the inverted document P is exposed from the discharge roller pair 19, 20, therefore, the document P can be removed away also by pulling the document toward the discharge tray portion 13.

Figure 12:
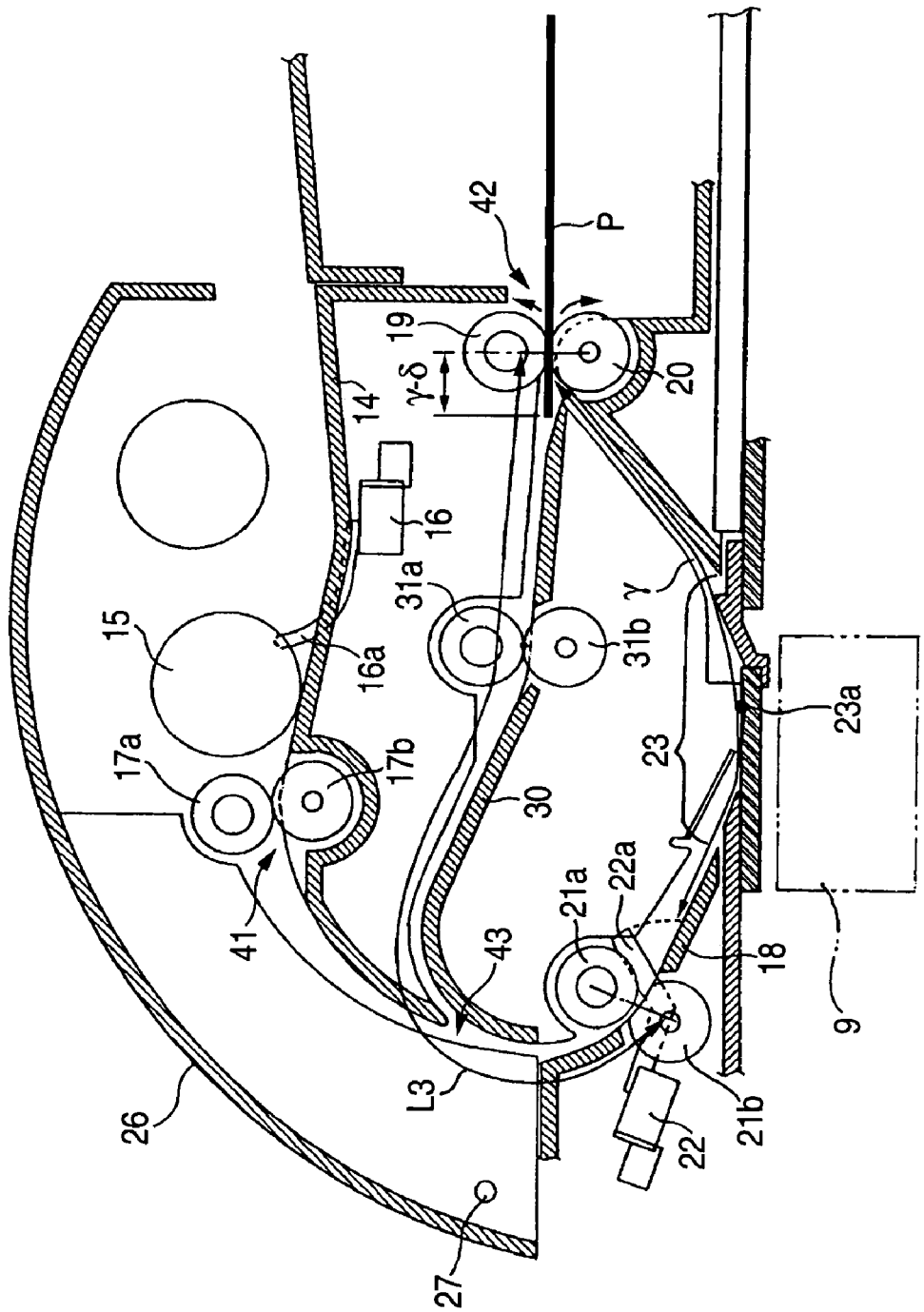
FIG. 12 is a diagram showing a state where a discharge roller pair 19, 20 stops transporting a document and a most part of the document is present outside the document inverting-and-transporting apparatus.

Accurately, the transport distance L4 does not coincide with a distance between the transport direction changing position 42 and the front end of the inversed document P. The distance between the transport direction changing position 42 and the front end of the inversed document P depends on a length of a portion, remaining in the document inverting-and-transporting apparatus 2, of the document P before inverted. Assuming that γ denotes a distance between a position where the rear sensor 22 detects the rear end of the document P (see FIG. 12) and the transport direction changing position 42 and that δ denotes a transport distance of the document P from a timing when the rear sensor 22 detects the rear end of the document P to a timing when the forward rotation of the discharge roller pair 19, 20 is stopped (see FIG. 12). Here, the distance between the transport direction changing position 42 and the front end of the inversed document P can be expressed as L4+(γ−δ). Accordingly, instead of L4>L3 and L4>L3+β, L4+(γ−δ)>L3+β may be used as a criterion. That is, when the front end of the inverted document P is not detected although L4+(γ−δ)>L3+β, the determining section 63 may determine that a jam occurs.

Figure 4:
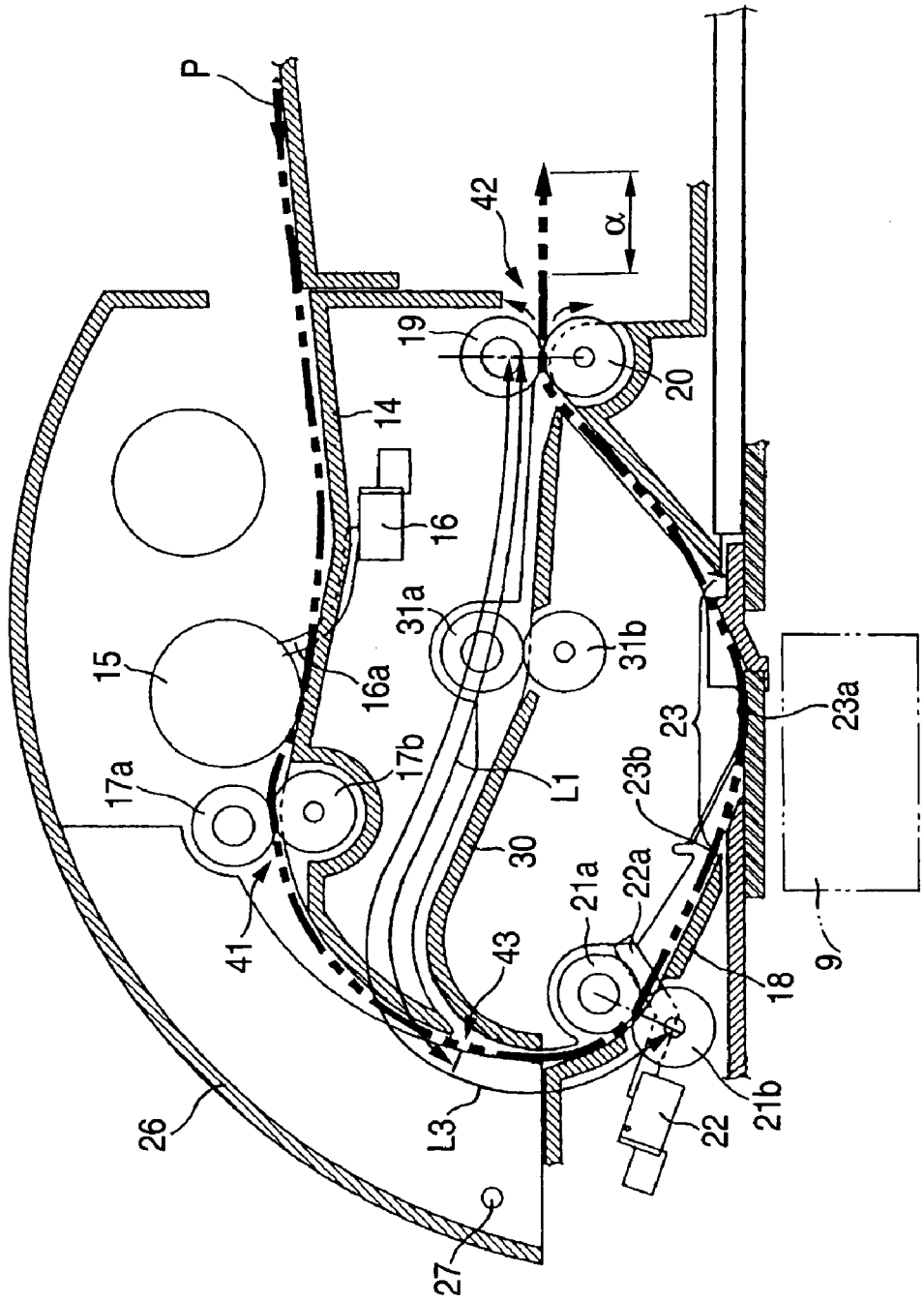
FIG. 4 is a diagram showing a route in the case where the surface of a document is to be read.

The operation of the thus configured document inverting-and-transporting apparatus 2 will be described with reference to FIGS. 3 to 9. First, the document P is placed on the document table 12 with upward directing the front surface. When the front end of the document P collides with the detection lever 16a to swing the lever 16a, existence of the document P is detected by the sheet sensor 16. In response to an operation on the operation panel 5 to give a command to read both the faces (front and rear faces) of the document P, the document P is separated from a document stack, and begins to be fed by the feed roller pair 17a, 17b (the feeding portion 41) to the transport path 51. When the front end of the document P reaches the position of the feed roller pair 21a, 21b to swing the detection lever 22a, counting of the number of driving steps of the driving motor 301 is started to measure the length of the document P (S01), and the document P is transported by the feed roller pair 21a, 21b toward the reading opening 23. In the reading opening 23, the document P is exposed from the transport path 51, and the front surface which is on the side of the reading device 9 is sequentially read at the reading position 23a by the reading device 9 that is disposed on the side of the lower face of the opposed end glass plate 4a (S02). As shown in FIG. 4, thereafter, the front end of the document P begins to be discharged by the discharge roller pair 19, 20 to the outside on the side of the discharge tray portion 13. When the rear end of the document P passes the feed roller pair 21a, 21b and the swinging of the detection lever 22a is canceled, the measurement of the length of the document P is ended and the length L of the document is detected (S03). The reading process remains to be conducted until the rear end of the document P passes the reading position 23a.

Figure 5:
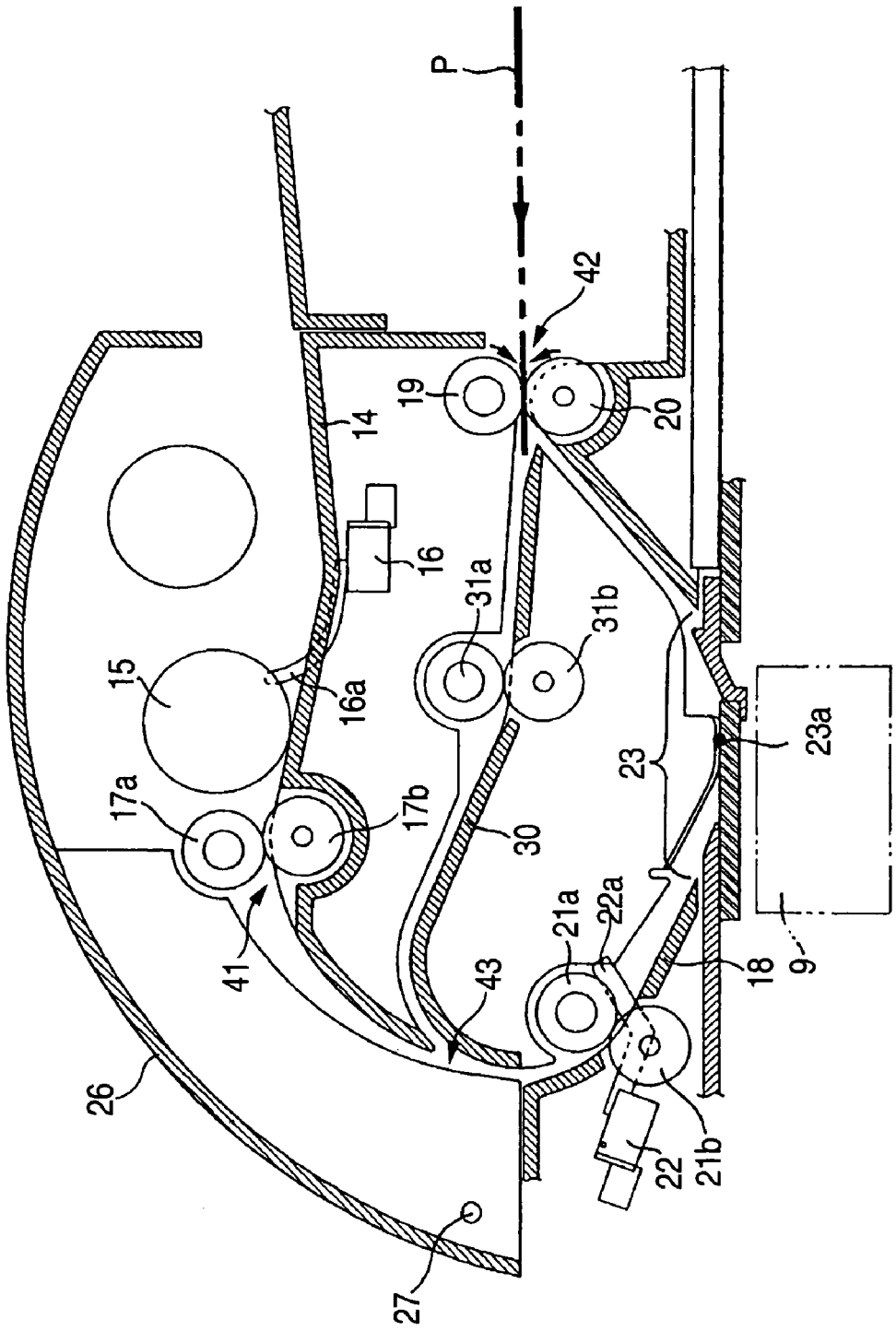
FIG. 5 is a diagram showing inversion of a document.

The comparing section 61 compares the document length L with the preset vale of (L1+α) (S04). If the result of the comparison is L≧(L1+α) (Yes in S05), the controlling section 62 controls the rotation direction of the driving motor 301 so that, at a timing when a major part of the-length of the document P which is being discharged by the discharge roller pair 19, 20 is discharged, the rotation direction of the discharge roller pair 19, 20 is reversed as shown in FIG. 5. As a result, while setting the rear end of the document P as a front end, the document is fed to the inversion-and-transport path 52 (S06). On the other hand, if the result of the comparison is L<(L1+α) (No in S05), the controlling section 62 controls the discharge roller pair 19, 20 so as not to be reversely rotated, so that the document P is discharged as it is to the discharge tray portion 13 (S07), and an error indication indicating that the document is not adequate for double-face reading is displayed on the displaying section 66 (S08).

Figure 6:
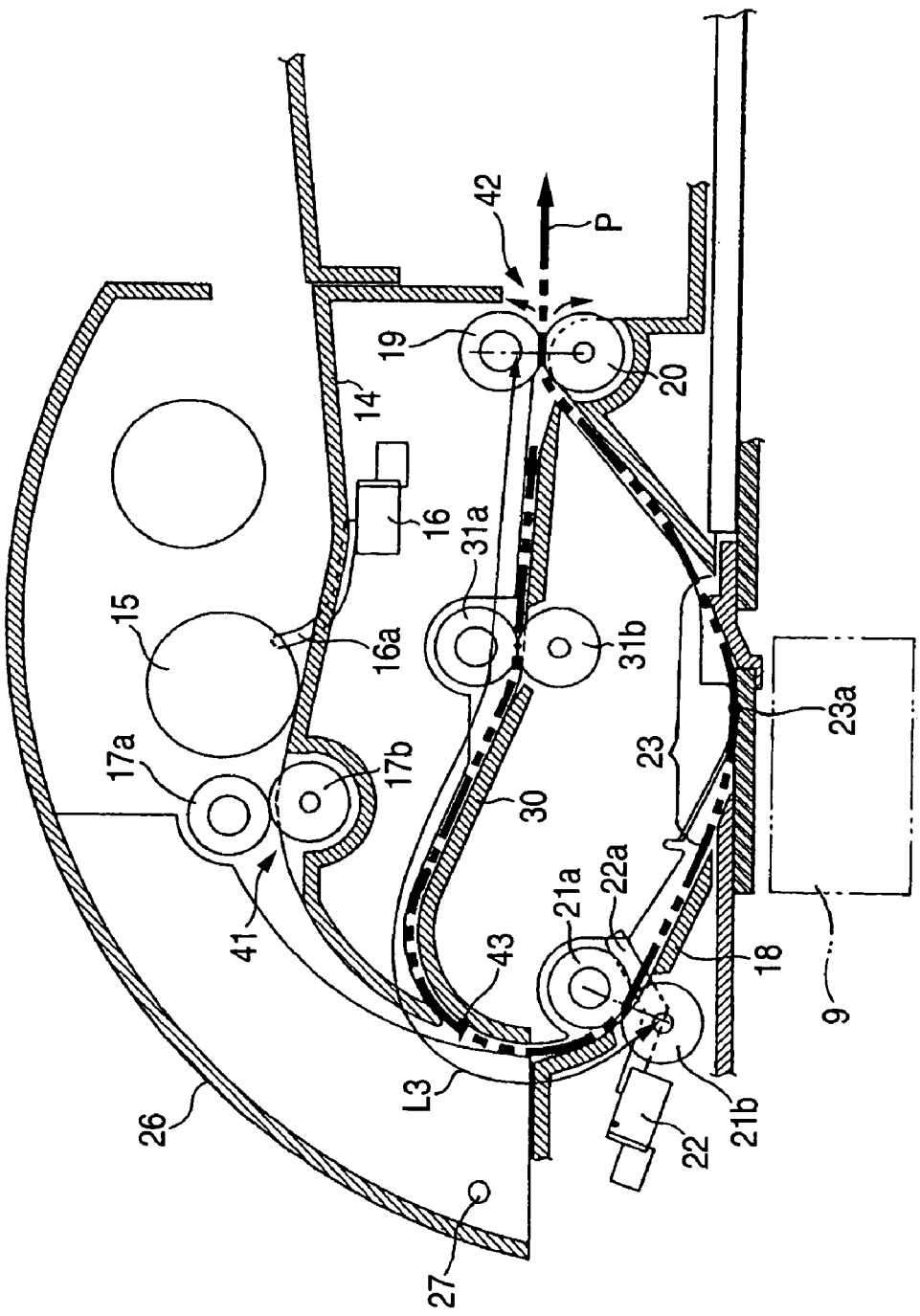
FIG. 6 is a diagram showing a route in the case where the rear face of an inverted document is to be read.

When the result of the comparison is L≧(L1+α) and the document P is fed to the inversion-and-transport path 52, the controlling section 62 starts the measurement of the transport distance L4 of the document P (the counting of the number of driving steps of the driving motor 301) (S09). The comparing section 61 compares the reverse transport distance L4, which is obtained on the basis of the counted driving step number, with the preset length L3 (S10). When the document P fed to the inversion-and-transport path 52 by the discharge roller pair 19, 20 is normally transported, the document is transported also by the feed roller pair 31a, 31b as shown in FIG. 6, and in the joining position 43 then joins the transport path 51 to reach the feed rollers 21a, 21b. Until L4>L3 is attained, therefore, the comparison of the reverse transport distance L4 is continued (No in Sl). If L4>L3 (Yes in S11), the followings are conducted. At this timing, under normal transport, the detection lever 22a of the rear sensor 22 already detects the arrival of the document P (Yes of S12). Therefore, the determining section 63 dose not determine that a jam occurs, and, in the same manner as the case of the front surface of the document P, the document P is further transported so as to be read at the reading position 23a by the reading device 9. The rear face of the document P is then read (S13), and the document P is completely discharged to the discharge tray portion 13 by the discharge roller pair 19, 20, whereby the process of reading the two faces of the document P is ended.

On the other hand, if, although L4>L3 (Yes in S11), the document P is not detected by the rear sensor 22 (No in S12), the determining section 63 determines that a jam occurs in the closed portion. Then, the controlling section 62 stops the discharge roller pair 19, 20 transporting the document P to the inversion-and-transport path 52 by (S14), and displays an error indication indicating that a jam occurs, on the displaying section 66 (Sl5).

The operations of S01 to S15 are repeatedly sequentially conducted also on the second and subsequent documents stacked on the document table 12.

Figure 10:
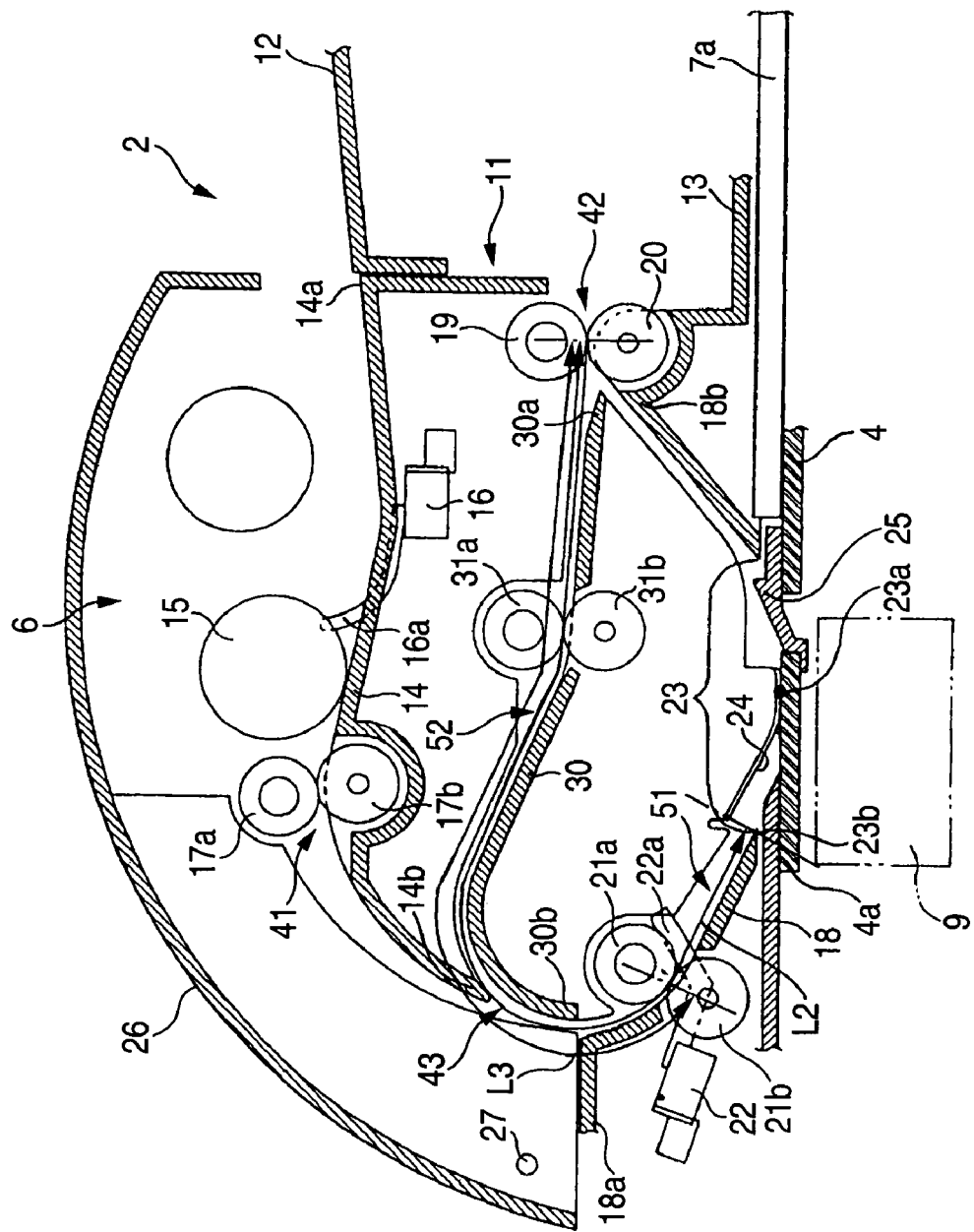
FIG. 10 is a side section view of main portions of a document inverting-and-transporting apparatus according to a second embodiment.
Figure 11:
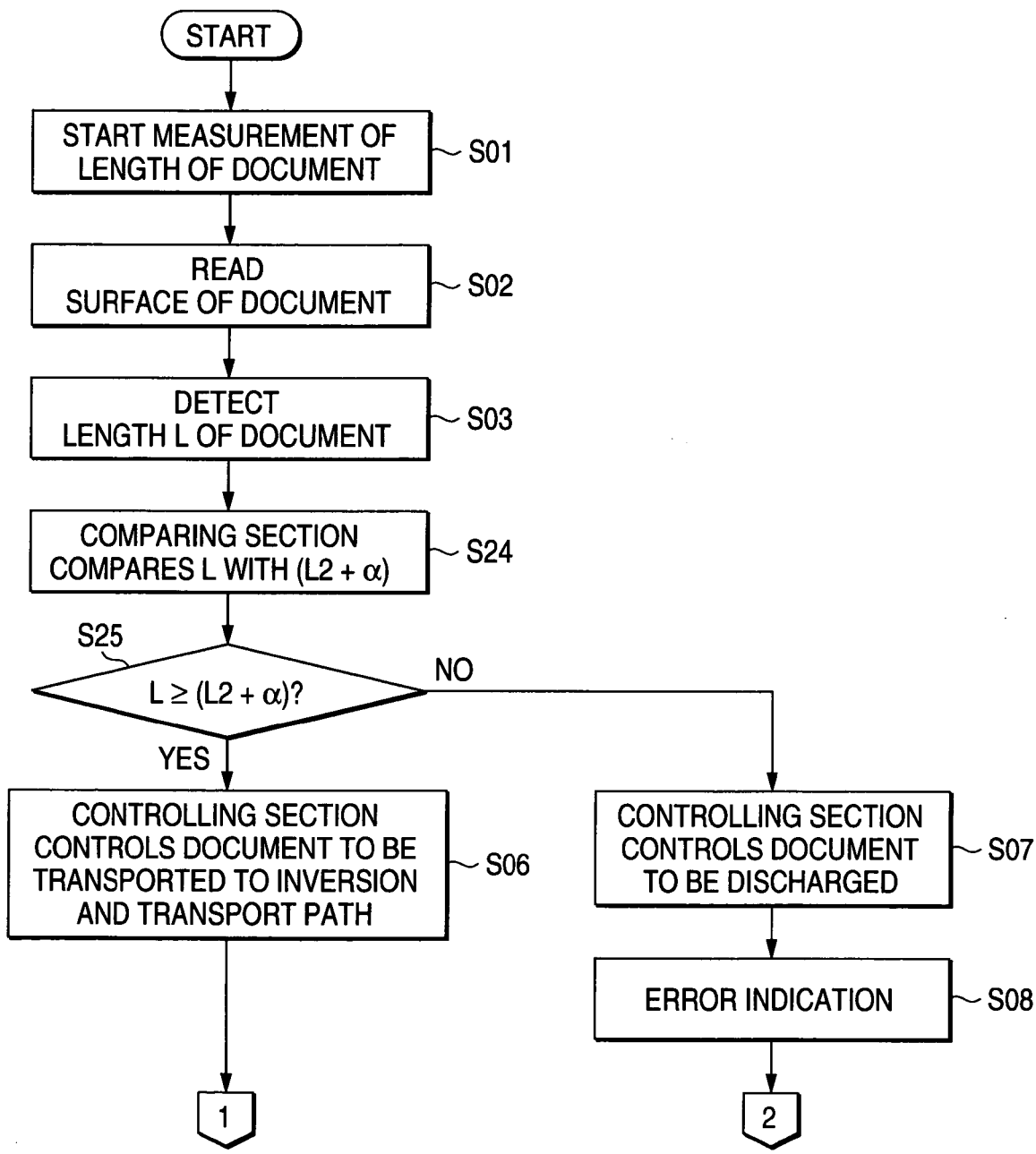
FIG. 11 is a flowchart related to an inverting operation in the second embodiment.

Next, a second embodiment of the invention will be described. FIG. 10 is a side section view of main portions of a document inverting-and-transporting apparatus according to the second embodiment. FIG. 11 is a flowchart related to an inverting operation in the second embodiment. The flowchart of FIG. 11 is continuous to that of FIG. 9. The second embodiment is configured in the same manner as the first embodiment. Therefore, identical components are denoted by the same reference numerals, and their detailed description is omitted.

In the first embodiment, in order to control whether the document P is to be transported to the inversion-and-transport path 52 or not, the length L1 of the route elongating from the transport direction changing position 42 to the joining position 43 via the intermediate route plate 30 (the closed portion) of the inversion-and-transport path 52 is compared with the length L of a document P. By contrast, the second embodiment is configured in the following manner. The storage section 67 previously stores the length L2 from the transport direction changing position 42 to the reading opening 23 via the intermediate route plate 30 (the closed portion) of the inversion-and-transport path 52 and the joining position 43, more specifically the length L2 (see FIG. 10) to an end 23b of the reading opening 23 on the upstream side in the transport direction. The comparing section 61 compares the length L2 with the document length L (S24 of FIG. 11).

In the same manner as the first embodiment, the depth dimension a from an edge of a document which is a dimension enabling the document to be picked out is added to the length L2. If L≧(L2+α) (Yes in S25 of FIG. 11), the document P is controlled so as to be transported to the inversion-and-transport path 52. If L<(L2+α) (No in S25 of FIG. 11), the document P is inhibited from being transported to the inversion-and-transport path 52. Therefore, the document P fed to the inversion-and-transport path 52 usually reaches at least the reading opening 23 at the timing when the rear end of the document P leaves the transport direction changing position 42. When the lid-like cover member 7 is opened, the document P can be exposed in the reading opening 23. When the swing cover member 26 is opened, the document P can be exposed in the joining position 43, which is positioned upstream of the reading opening 23 in the transport direction. Therefore, the document P can be removed away from the reading opening 23 or the joining position 43. The document length L is longer than L2 by at least a which enables the document to be picked out. Therefore, the front end of the document P exposed from the reading opening 23 is ensured to have a dimension which allows the user to pick the document. Consequently, the document can be easily removed away.

In the route elongating via the intermediate route plate 30 of the inversion-and-transport path 52 and the joining position 43, the distance between the reading opening 23 and the transport direction changing position 42 is larger than that between the rear sensor 22 and the portion 42. When L2 is compared with L1 used in the first embodiment, therefore, L2>L1 is attained. Consequently, the conditions for determining whether the document P is to be transported to the inversion-and-transport path 52 or not are severer than those in the first embodiment in which L1 is compared with the document length L. In the reading opening 23, however, the document P can be removed away very easily because the lid-like cover member 7 in which the reading opening 23 is disposed can be largely opened with respect to the body case 3 by means of the hinges 8, and the reading opening 23 has an opening area which is sufficiently large for removing away the document P. Therefore, it is possible to attain an effect that removal of the document P from the reading opening 23 can be conducted more easily than that from the narrower joining position 43. In the case where the apparatus is configured so that the swing cover member 26 is not disposed, the joining position 43 cannot be exposed. In this case, therefore, the second embodiment in which L2 is compared with the document length L is more preferable.

Also in the second embodiment, in the same manner as the first embodiment, the length L3 of the route elongating from the transport direction changing position 42 to the rear sensor 22 for detecting existence of a document via the joining position 43 is compared with the transport distance L4 of the document P from the transport direction changing position 42 to the inversion-and-transport path 52. If, although L4>L3, the document P is not detected by the rear sensor 22 of the detecting section 64, the determining section 63 determines that a jam occurs in the inversion-and-transport path 52. Then, the controlling section 62 stops the document transport to the inversion-and-transport path 52. Therefore, it is possible to rapidly determine that a jam occurs in the closed portion, and the jam is prevented from being aggravated.

In the first and second embodiments, the transport direction changing position 42 coincides with the position of the discharge roller pair 19, 20. Alternatively, the invention may be applied to a structure in which a discharge roller pair is placed downstream of the transport direction changing position 42 in the discharge direction.

The invention may be applied also to a mode in which the swing cover member 26 for exposing the joining position 43 is not provided.

In the first and second embodiments, the comparing section 61 implements both the control whether the document P is transported to the inversion-and-transport path 52 or not, and the determination whether the document P causes a jam in the closed portion or not. Alternatively, the comparing section may be configured so as to implements one of the control and the determination.

A mechanism of again inverting the document P in which reading of the rear face has been ended may be added to the first and second embodiments, so that documents P are stacked on the discharge tray portion 13 in the same order as that in which the documents P have been originally stacked on the document table 12.

A discharging portion may be configured in the following manner. Another driven roller is disposed so as to conduct a nipping operation, below the driving roller of the transport direction changing position 42, the direction of transporting the document P via the reading position 23a is changed by reverse driving of the driving roller, and a further driven roller is disposed so as to conduct a nipping operation, above the driving roller. A flipper is disposed in the vicinity of the driving roller in the inversion-and-transport path so as to conduct a switching control whether the transport path of the document P is set to the inversion-and-transport path or the document P is guided to the place of the upper driven roller to be discharged.

In the invention, the closed portion means a transport path in which all areas other than the inlet and the outlet are closed, and which cannot be easily opened. In the embodiments, in order to open the closed portion (the closed transport path), the document inverting-and-transporting apparatus 2 must be disassembled. However, "closed portion" in the invention is not limited to the above. Namely, "closed portion" in the invention means also "closed portion" which can be opened only by performing plural procedures (complex procedures) or cumbersome procedures.

In the document inverting-and-transporting apparatus 2 including the closed portion, a gear train such as a driving force transmission system for transporting a document in the closed portion can be simply configured. Since the configuration for opening is not necessary, the size of the document inverting-and-transporting apparatus 2 can be reduced. As a result, the production cost can be reduced. Since the configuration for opening is not disposed, rattle of the document inverting-and-transporting apparatus 2 is reduced, so that the transport accuracy is improved, and defects such as a skew in document transport are reduced.

What is claimed is:

1. A document inverting-and-transporting apparatus which is to be mounted on an image reading apparatus having a reading unit which reads an image of a document at a reading position, the document inverting-and-transporting apparatus comprising:
 a transport path including:
  a first route along which the document is transported from a feeding start position to a transport direction changing position;
  a joining position; and
  the reading position, wherein the joining position and the reading position are located in the first route in a sequence along a document transport direction;
 an inversion-and-transport path including a second route along which the document is transported from the transport direction changing position to the reading position via the joining position;
 a document transporting unit which transports the document;
 a closed portion which constitutes a part of the inversion-and-transport path;
 a document length detecting unit which detects a length of the document before the document is transported from the transport direction changing position to the inversion-and-transport path;
 a first comparing unit which compares the detected length of the document with a predetermined length which is larger than a length of the closed portion;
 a controlling unit which determines whether the document is to be transported to the inversion-and-transport path or not on the basis of a result of the comparison by the first comparing unit and controls the document transporting unit on the basis of the determination;
 a document detecting unit which is disposed downstream of the joining position in the document transport direction, and detects whether the document exists or not;
 a second comparing unit which compares L3 with L4 where L3 denotes a length from the transport direction changing position to the document detecting unit via the joining position and L4 denotes a transport distance by which the document transporting unit transports the document from the transport direction changing position into the inversion-and-transport path; and
 a determining unit which, on the basis of a result of the comparison by the second comparing unit, determines whether a jam occurs in the inversion-and-transport path or not.

2. The document inverting-and-transporting apparatus according to claim 1, wherein, if the document detecting unit detects that the document does not exist although the result of the comparison by the second comparing unit is L4>L3, the determining unit determines that the jam occurs in the inversion-and-transport path.

3. The document inverting-and-transporting apparatus according to claim 2, wherein after both surfaces of the document are read at the reading position, the controlling unit controls the transporting unit to discharge the document to an outside of the document inverting-and-transporting apparatus.

4. The document inverting-and-transporting apparatus according to claim 1, wherein the document detecting unit is disposed between the joining position and the reading position.

5. The document inverting-and-transporting apparatus according to claim 4, wherein the document length detecting unit and the document detecting unit are configured by a common sensor.

6. A document inverting-and-transporting apparatus which is to be mounted on an image reading apparatus having a reading unit which reads an image of a document at a reading position, the document inverting-and-transporting apparatus comprising:
   a transport path including:
      a first route along which the document is transported from a feeding start position to a transport direction changing position;
      a joining position; and
      the reading position, wherein the joining position and the reading position are located in the first route in a sequence along a document transport direction;
   an inversion-and-transport path including a second route along which the document is transported from the transport direction changing position to the reading position via the joining position;
   a document transporting unit which transports the document;
   a document length detecting unit which detects a length of the document before the document is transported from the transport direction changing position to the inversion-and-transport path;
   a pair of rollers disposed at the transport direction changing position;
   a first comparing unit which compares the detected length of the document with a predetermined length;
   a controlling unit which controls the pair of rollers to rotate in a first rotating direction and reverse the first rotating direction to a second direction to transport the document, which has been transported through the first route, to the second route when the detected length of the document is longer than the predetermined length on the basis of a comparing result of the first comparing unit, and
   to rotate in the first rotating direction to discharge the document transported through the second route;
   a document detecting unit which is disposed downstream of the joining position in the document transport direction, and detects whether the document exists or not;
   a second comparing unit which compares (L3+β) with L4 where L3 denotes a length from the transport direction changing position to the document detecting unit via the joining position; L4 denotes a transport distance by which the document transporting unit transports the document from the transport direction changing position into the inversion-and-transport path; and β denotes a predetermined length for determination of jam; and
   a determining unit which, on the basis of a result of the comparison by the second comparing unit, determines whether the jam occurs in the inversion-and-transport path or not.

7. The document inverting-and-transporting apparatus according to claim 6, wherein if the document detecting unit detects that the document does not exist although the result of the comparison by the second comparing unit is L4>(L3+β), the determining unit determines that the jam occurs in the inversion-and-transport path.

8. The document inverting-and-transporting apparatus according to claim 7, wherein after both surfaces of the document are read at the reading position, the controlling unit controls the transporting unit to discharge the document to an outside of the document inverting-and-transporting apparatus.

9. The document inverting-and-transporting apparatus according to claim 6, wherein the document detecting unit is disposed between the joining position and the reading position.

10. The document inverting-and-transporting apparatus according to claim 9, wherein the document length detecting unit and the document detecting unit are configured by a common sensor.

11. A document inverting-and-transporting apparatus which is to be mounted on an image reading apparatus having a reading unit which reads an image of a document at a reading position, the document inverting-and-transporting apparatus comprising:
   a transport path including:
      a first route alone which the document is transported from a feeding start position to a transport direction changing position;
      a joining position; and
      the reading position, wherein the joining position and the reading position are located in the first route in a sequence along a document transport direction;
   an inversion-and-transport oath including a second route alone which the document is transported from the transport direction changing position to the reading position via the joining position;
   a document transporting unit which transports the document;
   a document length detecting unit which detects a length of the document before the document is transported from the transport direction changing position to the inversion-and-transport path;
   a pair of rollers disposed at the transport direction changing position;
   a first comparing unit which compares the detected length of the document with a predetermined length;
   a controlling unit which controls the pair of rollers
      to rotate in a first rotating direction and reverse the first rotating direction to a second direction to transport the document, which has been transported through the first route, to the second route when the detected length of the document is longer than the predetermined length on the basis of a comparing result of the first comparing unit, and
      to rotate in the first rotating direction to discharge the document transported through the second route;
   a document detecting unit which is disposed downstream of the joining position in the document transport direction, and detects a front end of the document and a rear end of the document;
   a second comparing unit which compares (L3+β) with L4+(γ−δ) where L3 denotes a length from the transport direction changing position to the document detecting unit via the joining position; L4 denotes a transport distance by which the document transporting unit transports the document from the transport direction changing position into the inversion-and-transport path; β denotes a predetermined length for determination of jam; γ denotes a length from a rear detection position where the document detecting unit detects the rear end of the document to the transport direction changing position; and δ denotes a transport distance from a timing when the document detecting unit detects the rear end of the document to a timing when the transporting unit once stops transporting the document; and a determining unit which, on the basis of a result of the comparison by the second comparing unit, determines whether the jam occurs in the inversion-and-transport path or not.

12. The document inverting-and-transporting apparatus according to claim 11, wherein if the document detecting unit detects that a document does not exist although the result of the comparison by the second comparing unit is $L4+(\gamma-\delta)>(L3+\beta)$, the determining unit determines that the jam occurs in the inversion-and-transport path.

13. The document inverting-and-transporting apparatus according to claim 12, wherein after both surfaces of the document are read at the reading position, the controlling unit controls the transporting unit to discharge the document to an outside of the document inverting-and-transporting apparatus.

14. The document inverting-and-transporting apparatus according to claim 11, wherein the document detecting unit is disposed between the joining position and the reading position.

15. The document inverting-and-transporting apparatus according to claim 14, wherein the document length detecting unit and the document detecting unit are configured by a common sensor.

16. A document inverting-and-transporting apparatus comprising:

a transporting unit which transports a document;

a transport path including a joining position, a reading position where the document is read by a reading unit, and a transport direction changing position where the transporting unit changes a transport direction of the document;

an inversion-and-transport path between the transport direction changing position and the joining position without including the reading position;

a document length detecting unit which detects a length of the document;

a first comparing unit which compares the detected length of the document with a predetermined length which is equal to or larger than a length between the joining position and the document direction changing position;

a controlling unit which determines whether the document is to be transported to the inversion-and-transport path or not on the basis of a result of the comparison by the first comparing unit and controls the document transporting unit on the basis of the determination;

a document detecting unit which is disposed downstream of the joining position in the document transport direction, and detects whether a document exists or not;

a second comparing unit which compares L3 with L4 where L3 denotes a length from the transport direction changing position to the document detecting unit via the joining position and L4 denotes a transport distance by which the document transporting unit transports the document from the transport direction changing position into the inversion-and-transport path; and a determining unit which, on the basis of a result of the comparison by the second comparing unit, determines whether a jam occurs in the inversion-and-transport path or not, wherein:

if the document detecting unit detects that the document does not exist although the result of the comparison by the second comparing unit is L4>L3, the determining unit determines that the jam occurs in the inversion-and-transport path.

* * * * *